Jan. 5, 1960  I. J. ALLEN  2,920,154
SPEED SENSITIVE SWITCH
Filed Oct. 11, 1957  2 Sheets-Sheet 1

I. J. ALLEN
INVENTOR.

BY
ATTORNEYS

Jan. 5, 1960 I. J. ALLEN 2,920,154
SPEED SENSITIVE SWITCH
Filed Oct. 11, 1957 2 Sheets-Sheet 2

I.J. ALLEN
INVENTOR.

BY E. C. McRae
J. R. Faulkner
J. H. Oster
H. L. Jerschling
ATTORNEYS

# United States Patent Office 2,920,154
Patented Jan. 5, 1960

2,920,154
SPEED SENSITIVE SWITCH

Ivis J. Allen, Ann Arbor, Mich., assignor to Ford Motor Company, Dearborn, Mich., a corporation of Delaware Application October 11, 1957, Serial No. 689,663

2 Claims. (Cl. 200—56)

This invention relates to a speed sensitive switch which may be used in connection with a speed warning device on an automotive vehicle or the like.

The applicant's invention relates to an eddy current device in which the hair spring is adjusted for a particular vehicle speed. When that vehicle speed is arrived at, a contact is completed which actuates a visual or audible warning device or both. The device may also be employed in other adaptations such as a transmission anti-creep brake, in which the brake is applied holding a vehicle until a certain speed has been reached, and a reverse and park inhibitor switch preventing the operation of the reverse and park operation with automatic transmissions until a minimum speed has been attained such as 2 or 3 miles per hour.

For a matter of illustration, however, the applicant has shown his device used as a speed warning arrangement. In this arrangement, an eddy current driven mechanism is driven by a cable connected to the conventional speedometer cable, such as by a T or other known connection. The eddy current mechanism has a rotating magnet, flux collector and a speed cup. An electrical contact is fixed to the speed cup staff and rotates with the staff. A stationary contact is secured to, but insulated from the device's housing and is connected to an audible or visual warning device. The closing of the contacts completes a circuit to ground and actuates the alarm.

The sensing devices consist of manually operable integral knob and pointer which is connected to a hairspring regulator. A hairspring is wound within the regulator and has its outer end secured to the regulator and its inner end to the speed cup staff. When the speed is set by turning the knob and pointer to the desired speed, the hairspring is effectively wound up to a predetermined torque equal to the speed cup torque output at the set speed. Upon reaching the set speed, the contacts close, and the warning signal is actuated. As can be seen, the device does not employ frictional members which causes surging or variations in the speed of the speed cup inconsistent with the true speed of the vehicle.

One of the main objects of this invention, therefore, is to provide a simple, yet inexpensive speed sensitive switch.

Another object is to provide a speed sensitive switch accurate and dependable in operation and not subject to surges or variations inconsistent with the true speed of the vehicle.

Other objects and advantages of this invention will be made more apparent as this description proceeds, particularly when considered in connection with the accompanying drawings, wherein.

Figure 1:
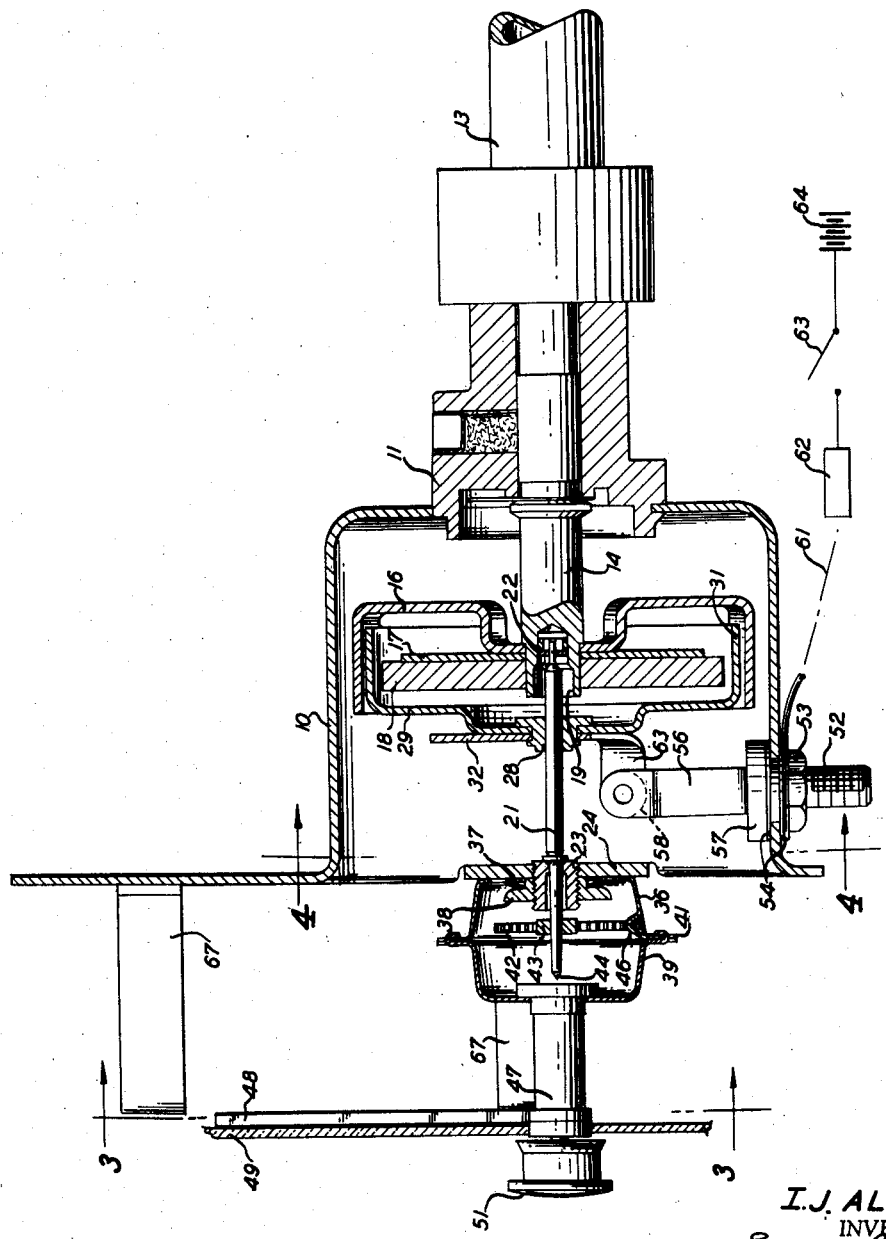
Figure 1 is a cross sectional view taken through a device embodying the applicant's invention.

Referring now to the drawings, a speed sensitive switch is shown having a housing 10 containing the elements of the device. Adjacent to the rear of the case 10 is a cable housing 11 through which is journalled the magnet shaft 14. Power to rotate magnet shaft 14 may be obtained from a T connection to the regular speedometer drive (not shown) or by any other convenient means through cable 13 threadably joined to the housing 11, and secured to the shaft 14 in a conventional manner. Shaft 14 is rotated clockwise, which in turn rotates the flux collector 16 which is secured to the free end of the magnet shaft 14. A temperature compensator 17 and a magnet 18 are journalled on the free end of the magnet shaft 14 adjacent to the collector 16 and rotates as a unit with the flux collector 16 and the shaft 14. The end of the magnet shaft 14 is provided with a recess 19 in which is positioned a hairspring staff 21 journalled in a bearing 22 positioned in recess 19.

Staff 21 is journalled at its forward end in a staff end play adjusting screw 23 which is threadably secured to bridge 24 which in turn is secured to the open end of the case 10 by means of tabs 26 which extend through holes 27 in the bridge 24 and are clinched to hold the bridge. Affixed to the staff 21 medially of the bridge 24 and bearing 22 is hub 28 to which is mounted the speed cup 29, and which extends axially inwardly of the flux collector 16 so that its outer flanged ends 31 are positioned between the magnet 18 and the collector 16. A contact holder 32 is also mounted adjacent the speed cup 29 by the peened edge of the hub 28. Holder 32 has an axially extending arm 33 on which is mounted a contact point 34 for a purpose to be later explained.

Forwardly of the bridge 24 is a hairspring regulator comprising a cup shaped rear hairspring regulator 36 with its closed section in friction contact with the bridge 24 and yieldably held there by a spring washer 37 and lock nut 38 which maintains a frictional lock on the rear hairspring regulator 36. A forward hairspring regulator 39, also cup shaped in configuration, is secured to the outer flange 41 of the regulator 36 by a plurality of equally spaced flaps 41.

Forwardly of the screw 23 and positioned within the confines of the regulator 36 is a hairspring 42 having its inner convolution secured to hub 43 mounted to the outer end 44 of the staff 21. The outer convolution of the hairspring 42 is secured to a raised tab 46 in the outer edge of the regulator 36.

Front hairspring regulator 39 is secured to shaft 47 which in turn has affixed to it a manual control knob 51 and a pointer 48. Pointer 48 may be positioned behind a glass dial 49 having the speed indicating means 66 shown thereon.

The device is completed by attaching a stationary terminal 52 to the housing 11 by nut 53 and is insulated therefrom by a pair of insulating washers 54 located on each side of the housing 11. An upstanding stationary spring arm 56 is secured such as by weldment means to the terminal head 57 and has a contact point 58 located at its upper end. Arm 56 extends inwardly of the housing and is arranged in the same vertical plane so that its contact point 58 and contact 34 on the arm 33 will meet.

Figure 2:
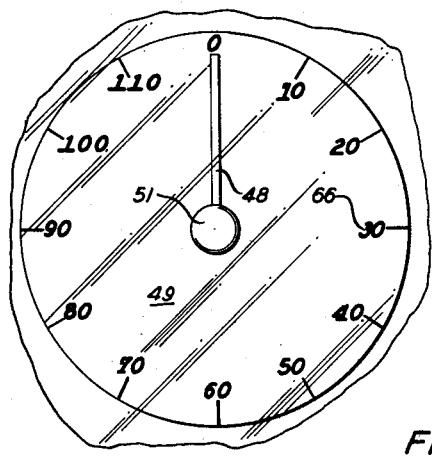
Figure 2 is a fragmentary front elevational view of the manually adjustable indicator and dial face.
Figure 4:
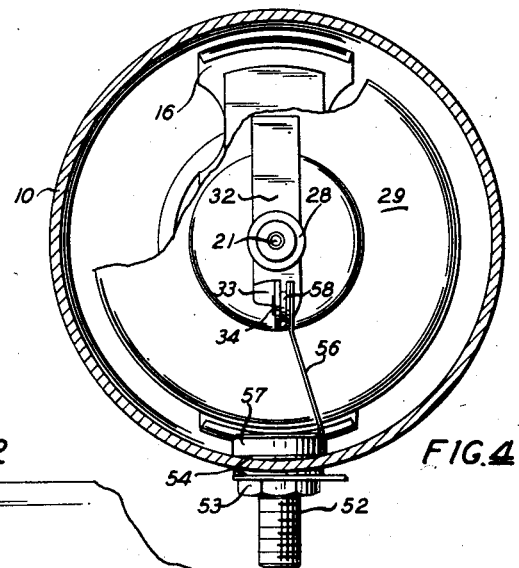
Figure 3:
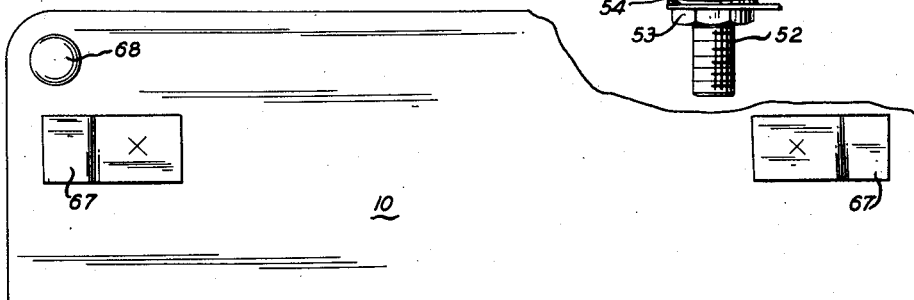
Figure 3 is a cross sectional view taken on the plane indicated as 3—3 of Figure 1; and, Figure 4 is a cross sectional view taken on the plane indicated as 4—4 of Figure 1.
Figure 3:
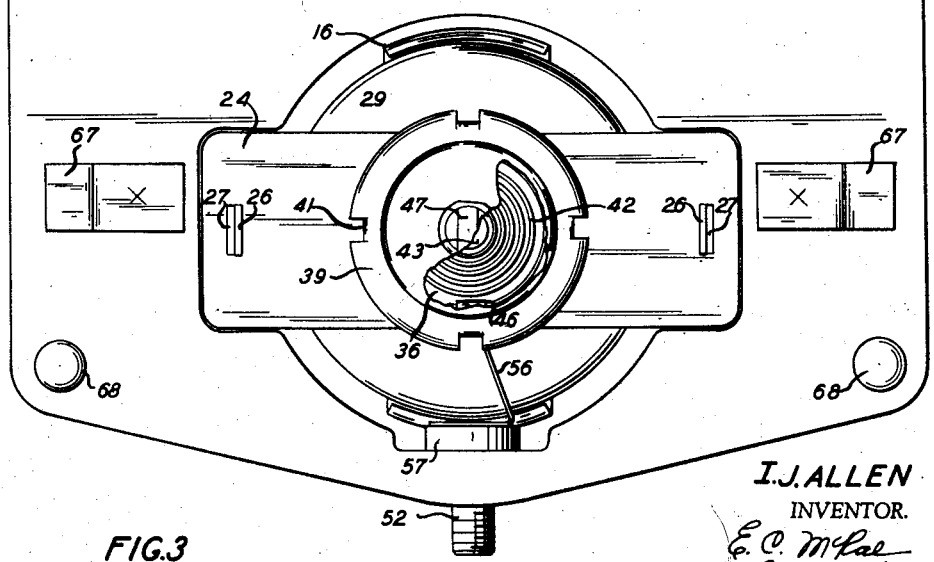

In actual operation, the speed setting knob is rotated clockwise as shown in Figure 2 turning the hairspring regulators 36 and 39, and thereby torquing the hairspring 42, which has been adjusted in assembly so that the exact speed indicated by the pointer will be the same as that indicated by the speedometer. The rotation of the speed setting knob likewise rotates the staff 21, which in turn separates the contact points 34 and 58 and moves the holder 32 away from stationary contact 56. The car, when accelerated, results in the counterclockwise rotation of the magnet 18 and the flux collector 16. Because of the eddy current coupling, the speed cup 29 is rotated counterclockwise against the restraining torque of the hairspring 42 until the contact points 34 on the rotating arm 33 and the contact point 58 on the stationary arm 59 meet and actuate the alarm.

A warning device of the audible, visual or combined type can be easily connected to the device through wire 61 mounted to the terminal 52 and connected to the warning device 62. The warning device 62 in turn is connected to ignition switch 63, which is in turn connected to the battery 64.

Any variety of dial means may be used with this structure and, of course, the entire device can be bolted to the dash by bolts 68.

It will be understood that the invention is not to be limited to the exact construction shown and described, but that various changes and modifications may be made without departing from the spirit and scope of the invention, as defined in the appended claims.

What is claimed is:

1. A speed sensitive switch for use on an automotive vehicle, said automotive vehicle having a device actuatable at a predetermined speed, a speedometer, an eddy current coupling including a rotatable magnet and a shaft mounted speed positionable cup, and driving means for actuating said speedometer and eddy current coupling, said speed sensitive switch comprising a manually positionable hairspring regulator having a rear cup-shaped member adapted to be yieldably connected to the vehicle, a forward cup-shaped member secured to the rear member to form a hollow shell, a hairspring connected to the inside of the rear cup-shaped member and adapted to be mounted upon the shaft portion of the speed positionable cup, first contact means movable with said hairspring regulator and second contact means adapted to be connected to said vehicle, said first contact means engaging said second contact means upon the reaching of a predetermined selected speed.

2. A speed warning switch for use on a motor vehicle, said motor vehicle having a speed warning device, a speedometer, an eddy current coupling including a rotatable magnet and a speed positionable cup, and driving means for actuating said speedometer and eddy current coupling in response to the speed of the vehicle, said speed warning switch comprising a manually adjustable regulator, said regulator comprising a hollow receptacle adapted to be yieldably secured to the vehicle, a coiled hairspring having its outer convolution secured to the inside of the hollow receptacle and its inner convolution adapted to be connected to the speed positionable cup, at least one contact adapted to be movable with said speed positionable cup, at least one contact adapted to be mounted upon the vehicle and connected to a warning device, said first mentioned contact being initially moved in spaced apart relationship to said second mentioned contact upon the manual positioning of said regulator.

References Cited in the file of this patent

UNITED STATES PATENTS

| | | |
|---|---|---|
| 1,166,765 | Kaminski | Jan. 4, 1916 |
| 1,989,547 | Clark | Jan. 29, 1935 |
| 2,728,072 | Magrid | Dec. 20, 1955 |
| 2,785,393 | Mininberg | Mar. 12, 1957 |